Nov. 30, 1926.

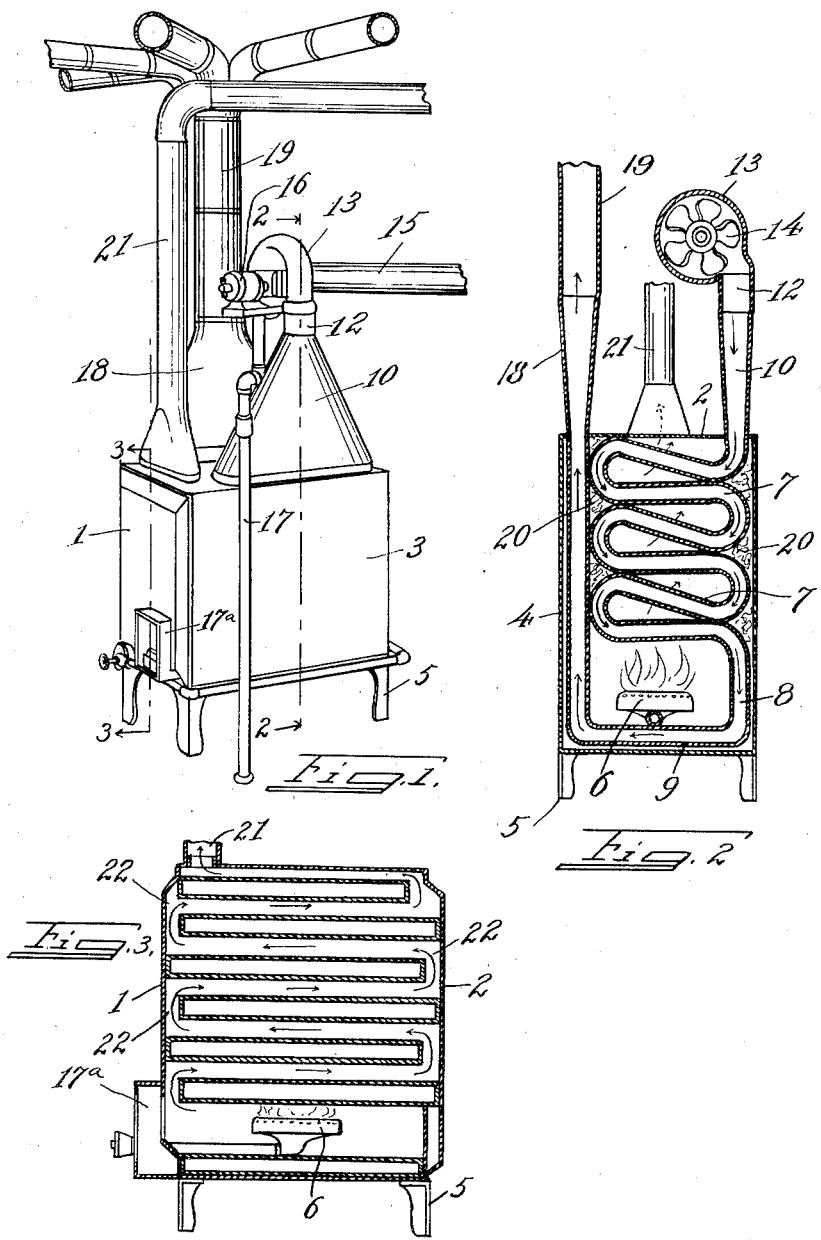

W. L. JOHNSTON ET AL 1,608,658

HEATING FURNACE

Filed March 5, 1925     2 Sheets-Sheet 2

INVENTORS
William Lee Johnston
Everett S. Buck
BY
ATTORNEYS.

Patented Nov. 30, 1926.

1,608,658

UNITED STATES PATENT OFFICE.

WILLIAM LEE JOHNSTON AND EVERETT S. BUCK, OF LOS ANGELES, CALIFORNIA, ASSIGNORS OF FIVE-TWELFTHS TO JAMES M. YEWELL, OF CINCINNATI, OHIO, AND SEVEN-TWELFTHS TO WILLIAM LEE JOHNSTON, OF LOS ANGELES, CALIFORNIA.

HEATING FURNACE.

Application filed March 5, 1925. Serial No. 13,074.

Our invention relates to air heating furnaces in which the air to be heated is forced to travel at high velocity from a comparatively small pipe through a continuous series of chambers located in a furnace chamber exposed to the heated gases and the products of combustion derived from a gas burner or other combustion source, and in which the air conduits serve as a series of hollow members to retard the flow of heated gases. The air is forced to travel transverse and in a reverse direction to the passage of the heated gases and from the coldest to the hottest point, so that in its passage the air is exposed on every side in the conduit chambers to the heated conduits and there is a maximum absorption of heat at a minimum expenditure of heat units and the highest degree of efficiency is obtained at a minimum cost.

In the ordinary hot air furnace the flow is by gravity and a comparatively large volume of air is essential to obtain any effective heat transference and the efficiency is very low; whereas our invention is developed on an opposite theory.

It is our aim to subject a comparatively small volume of air under forced pressure to reverse and transfer currents of heated gases retarded in their flow whereby the heat may be most effectively transferred to the air and this air delivered to the rooms to be heated in accurately regulated quantities.

A further object is to so design the construction that friction in the air passages may be reduced to a minimum in forcing the air therethrough and in which the various parts may be assembled at a minimum cost and in which the dimensions of the furnace may be reduced to a minimum to permit installation at any convenient place and not necessarily in basement or cellar.

The above objects and others to be hereinafter pointed out are attained by that certain novel construction and arrangement of parts illustrated in the drawings in which we have shown the preferred embodiment of our invention.

In the drawings:

Figure 1 is a perspective view of our improved furnace as set up ready for use.

Figure 2 is a central vertical section taken on the line 2—2 of Figure 1.

Figure 3 is a similar section taken on line 3—3 of Figure 1 at right angles to the section shown in Figure 2.

Figure 4:
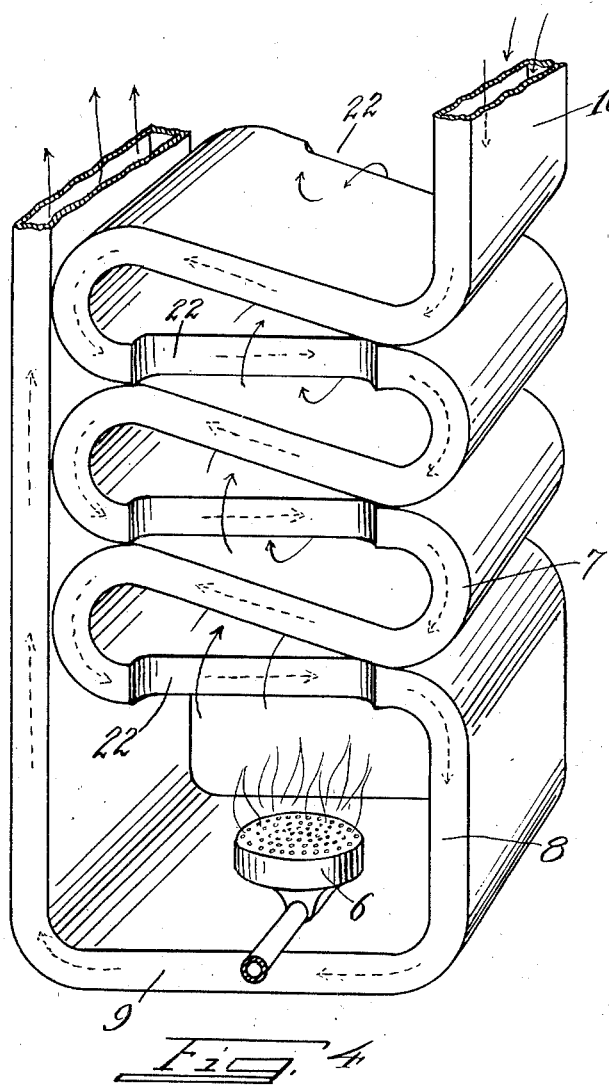
Figure 4 is a detail perspective of the heating unit.

The casing of our furnace is preferably rectangular in cross section with front and rear walls 1, 2, and side walls 3, 4, supported on feet 5.

In the embodiment selected, the heat is supplied from a gas burner 6 of the Bunsen type and preferably supplied with a pilot light of the usual construction.

Instead of a gas burner, however, other combustion and clean out means may be provided. Seated in the furnace chamber is the heating unit, which comprises a series of hollow air-tight conduits 7, which extend across the furnace chamber from front to rear and from side to side. These conduits are continuous and connected with an easy curve at the sides and are extended down one side of the chamber at 8 across the bottom at 9 and upwardly along the other side. At the upper inlet end a hollow member 10 connects the hollow conduits with a comparatively small discharge pipe 12 from the casing 13 of a fan blower 14, to which the cold air is supplied by pipe 15 from the outside. The fan is driven by a small electric motor 16 mounted on a standard 17 and controlled in a switch box 17ª preferably located at the front of the furnace. The other end of the conduit construction is connected by a suitable outlet 18 to the main distribution pipe 19.

The spaces between the conduits and the side walls of the furnace are packed with insulating material 20, to prevent radiation from the furnace.

At the front and rear alternately a space 22 is left for the passage of the heated gases which are thus caused to travel a pathway transverse the conduits and in the reverse direction to the passage of the air forced through the conduits by the blower, and 21 is a pipe for the final discharge of the products of combustion from the furnace.

With the above described construction, we are able to obtain very high efficiency in heating the air at a very low cost.

The motor starts the fan and the cold air is forced downward in the direction of the arrows in Figure 2, while the heated gases from the burner are forced to pass in a contrary direction back and forth between the conduits, thus heating them on all sides. The coolest point in the furnace casing is necessarily at the top and cold air from outside entering through the hollow conduits at this point, is, therefore, gradually heated as it passes downward through the conduit compartment in direct contact with the source of heat. Under the forced pressure generated by the blower every particle of the air is brought into direct contact with the heated conduits which are effectively heated by reason of the retarded flow of these products of combustion.

A very high percentage of the heat units generated is, therefore, absorbed by the conduits and the air in a strong, turbulent current has to come in contact with every portion of each conduit coil so that very unusual efficiency is the result.

Having thus described our invention, what we claim as new and desire to secure by Letters Patent, is:—

1. A heating furnace comprising a casing with a combustion chamber in its lower portion and an outlet in the upper portion, a smooth, unobstructed conduit folded back and forth, and extending across from side to side and end to end of the upper portion of the casing, with space between each fold, the folded conduit cut away on alternate sides midway of its length for the passage of the products of combustion back and forth across the conduit, and means to force the material to be heated through the conduit in a direction contrary to its natural thermal flow to be subjected on all sides to the heated products of combustion from the combustion chamber.

2. A heating furnace comprising a casing with a combustion chamber in its lower portion and an outlet in the upper portion, a smooth, unobstructed flattened conduit folded in loops, with the loops engaging each other at the ends to leave a central space intermediate each fold with the side portion of the folds cut away midway of their length alternately to leave transverse passageways from side to side for the heated products of combustion in a reverse direction to the flow through the conduit, and means to force the material to be heated through the conduit in a direction contrary to its natural thermal flow, whereby it may be heated on all sides by the heated products of combustion from the combustion chamber.

3. A heating furnace comprising a casing with a combustion chamber in its lower portion and an outlet in the upper portion, a smooth, unobstructed flattened conduit folded in loops, with the loops engaging each other at the ends to leave a central space intermediate each fold, with the side portion of the folds cut away midway of their length alternately to leave transverse passageways from side to side for the heated products of combustion, with the conduit extending around the combustion chamber and thence upwardly with a discharge outlet from the upper portion of the chamber, whereby a continuous reversed or counter flow is obtained, without the use of baffling constructions.

4. In a heating furnace comprising a casing with a combustion chamber in its lower portion, a heating unit in said chamber comprising a series of hollow air-tight continuous smooth, unobstructed conduits of a size to fill the furnace chamber, with the conduits connected by an easy curve at the ends and spaced apart, with the sides indented alternately midway of their length to leave a passage at alternate ends into the space between the conduits, and a means for enforcing a current of cold air to traverse said conduits from inlet to outlet in a direction contrary to its natural thermal flow.

WILLIAM LEE JOHNSTON.
EVERETT S. BUCK.